United States Patent [19]
Fujiyama et al.

[11] Patent Number: 5,839,332
[45] Date of Patent: Nov. 24, 1998

[54] SCREW GUIDE IN LINKED-SCREW TIGHTENER

[75] Inventors: Takeo Fujiyama; Osamu Ebisawa, both of Tokyo, Japan

[73] Assignee: Max Co., Ltd., Tokyo, Japan

[21] Appl. No.: 636,518

[22] Filed: Apr. 19, 1996

[30] Foreign Application Priority Data

| Apr. 21, 1995 | [JP] | Japan | 7-120580 |
| Jan. 19, 1996 | [JP] | Japan | 8-007750 |
| Jan. 19, 1996 | [JP] | Japan | 8-007751 |

[51] Int. Cl.⁶ ................................. B25B 23/04
[52] U.S. Cl. .......................... 81/434; 81/57.37
[58] Field of Search ................... 87/57.37, 433, 87/434, 435

[56] References Cited

U.S. PATENT DOCUMENTS

| 3,261,526 | 7/1966 | Novak .......................... 227/1 |
| 4,014,225 | 3/1977 | Lejdegard et al. . |
| 4,367,837 | 1/1983 | Manino ....................... 81/434 |
| 5,031,489 | 7/1991 | Young et al. ............. 81/57.37 |
| 5,083,483 | 1/1992 | Takagi ........................ 81/434 |
| 5,138,913 | 8/1992 | Chen ........................... 81/434 |
| 5,186,084 | 2/1993 | Totsu ........................ 81/57.37 |
| 5,186,085 | 2/1993 | Monacelli ................... 81/434 |
| 5,341,706 | 8/1994 | Takagi ........................ 81/434 |

FOREIGN PATENT DOCUMENTS

| 0 008 749 | 3/1980 | European Pat. Off. . |
| 0 532 819 | 3/1993 | European Pat. Off. . |
| 0 593 970 | 4/1994 | European Pat. Off. . |
| 0 623 426 | 11/1994 | European Pat. Off. . |
| 2641828 | 3/1978 | Germany ...................... 81/434 |
| 42 01 143 | 7/1993 | Germany . |
| 1316672 | 5/1973 | United Kingdom . |

*Primary Examiner*—David A. Scherbel
*Assistant Examiner*—Joni B. Danganan
*Attorney, Agent, or Firm*—Morgan, Lewis & Bockius

[57] ABSTRACT

In a linked-screw tightener in which linked screws held by a coupling belt at predetermined intervals is passed through a linked-screw guide passage provided near a leading end of and across a nose portion installed movably at the leading end of a linked-screw tightener body relative to a screwing direction, a foremost screw is fed into an open space between a pair of chuck pawls positioned in the substantially central part of the nose portion and capable of opening and closing in accordance with the movement of the nose portion relative to the linked-screw tightener body, and the supplied screw is driven with a driver bit, the screw guide unit includes: a foremost screw receiving port formed on the pair of chuck pawls wherein the foremost screw receiving port opens in the chuck pawls closing condition to allow the foremost screw to be fed into the open space between the pair of the chuck pawls; and a guide member disposed at the pair of the chuck pawls, for opening and closing the foremost receiving port to hold the foremost screw at the pair of the chuck pawls, wherein the guide member operates together the movement of the nose portion relative to the linked-screw tightener body.

7 Claims, 14 Drawing Sheets

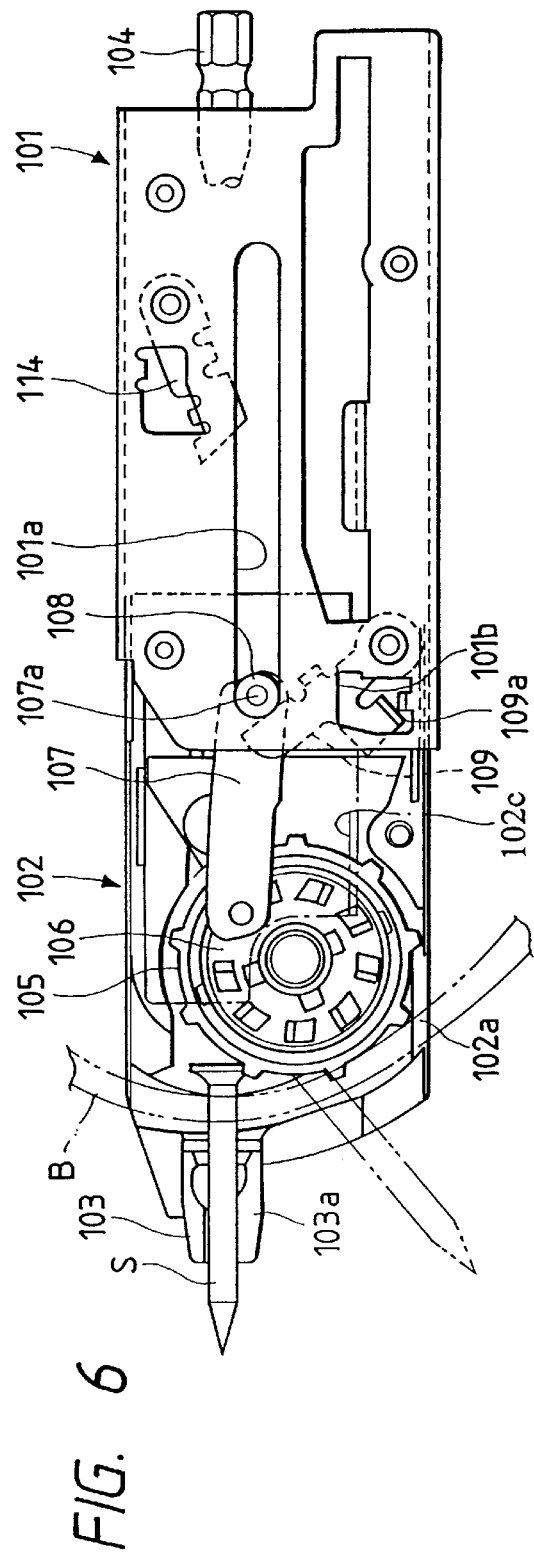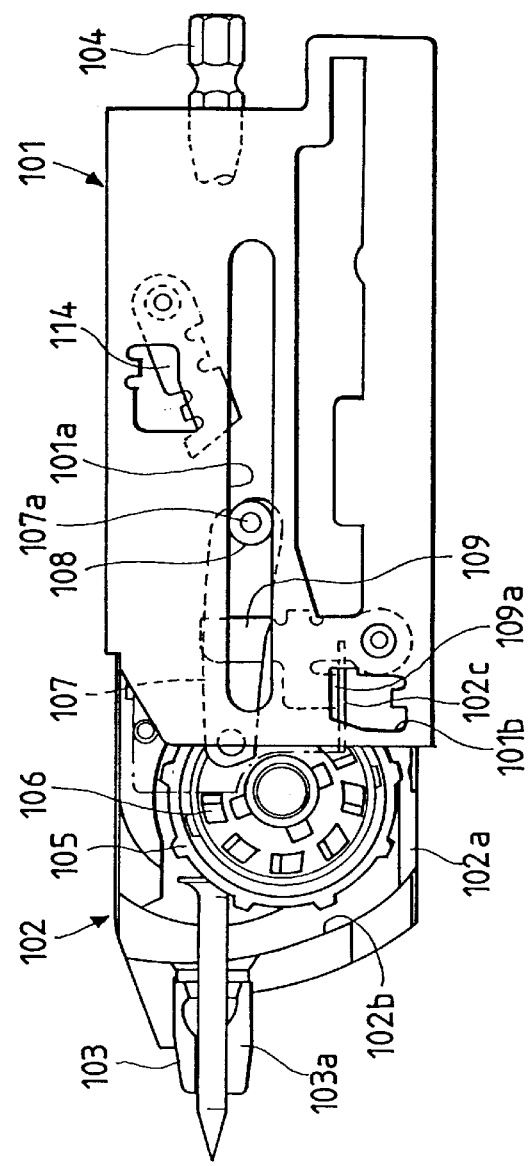

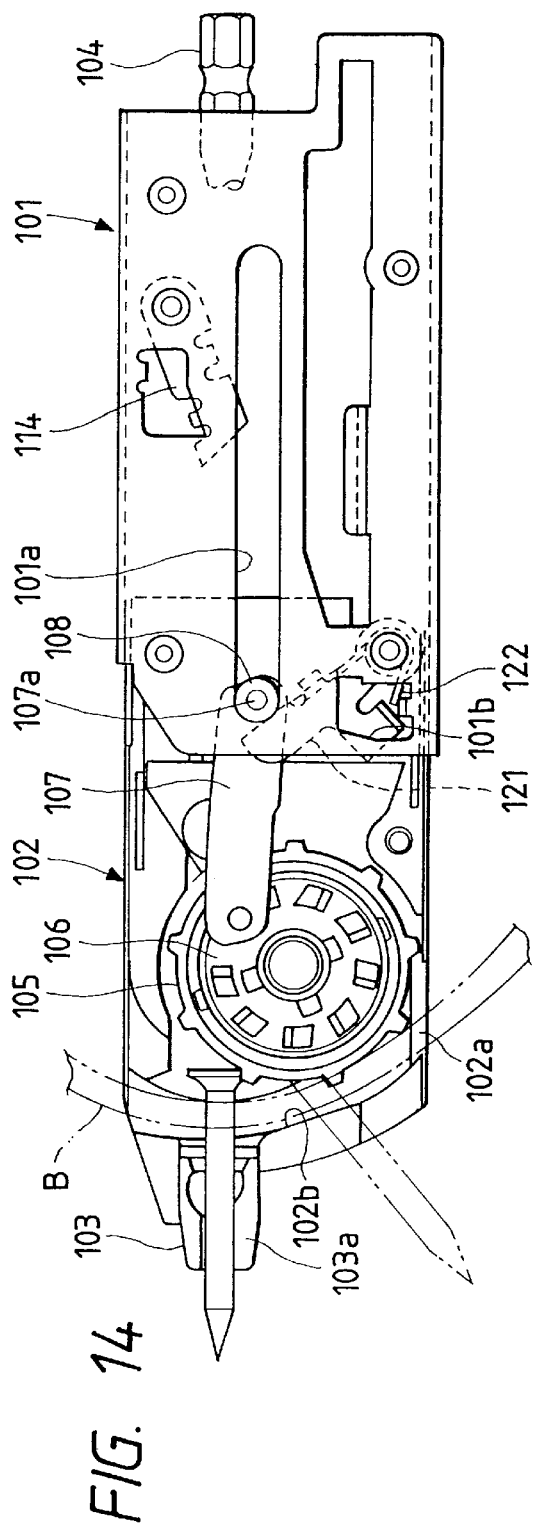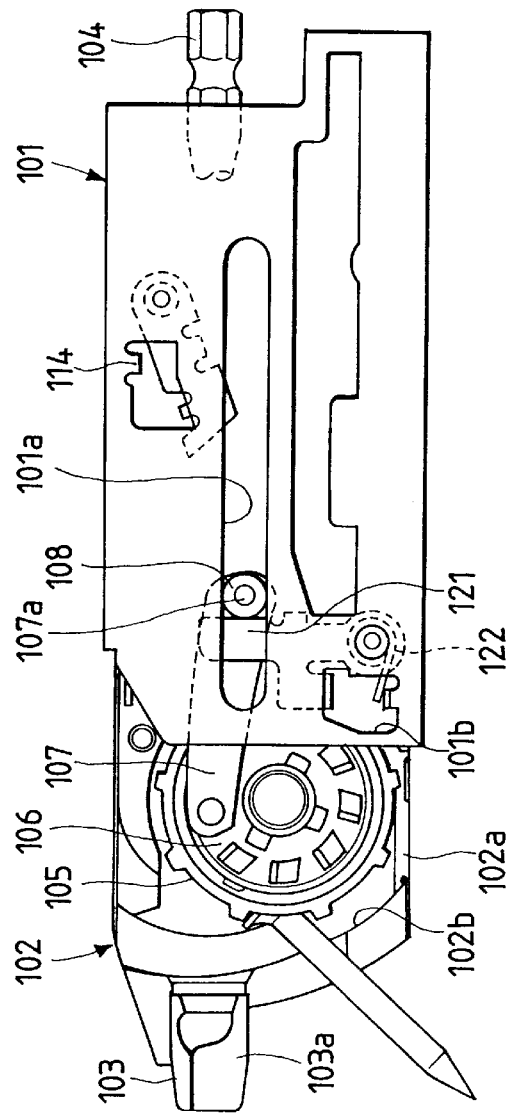

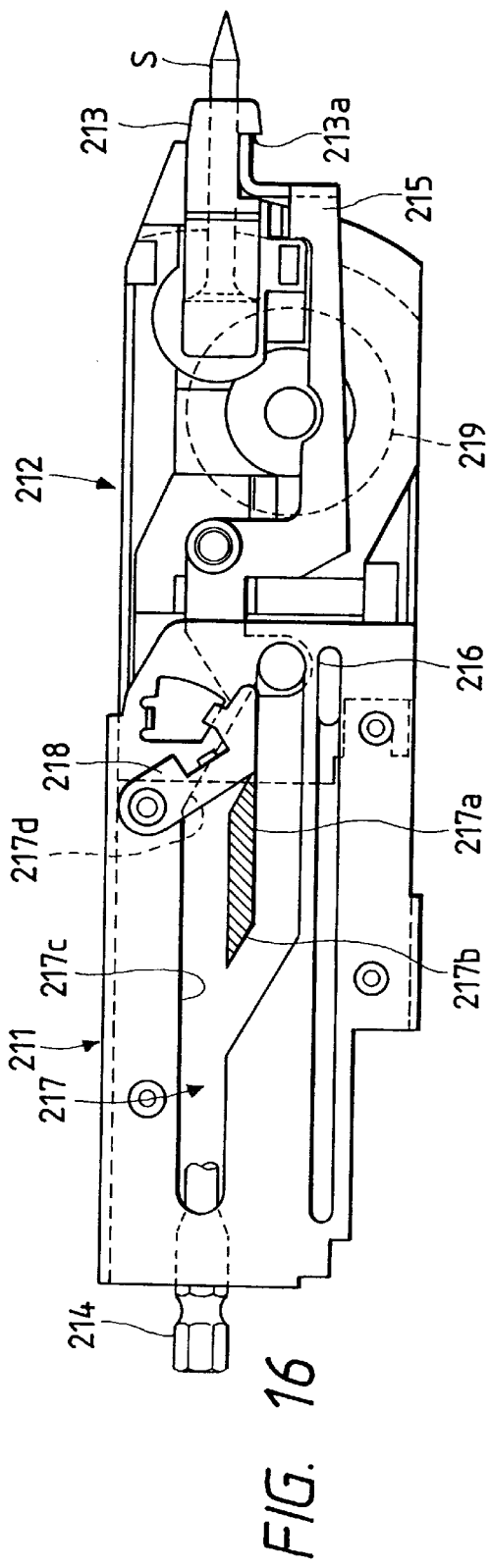
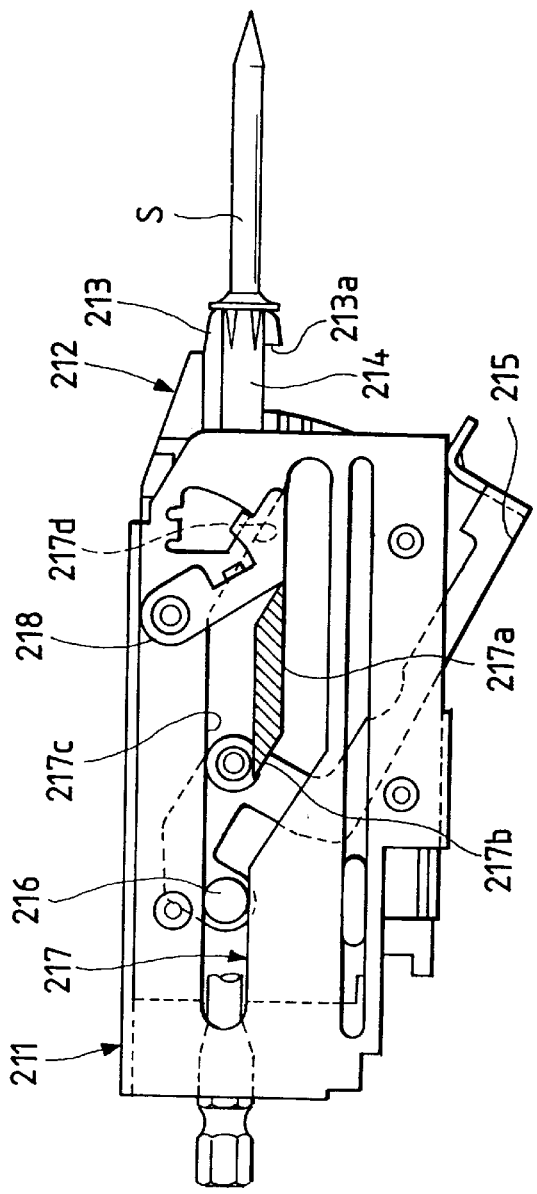
FIG. 16
FIG. 17

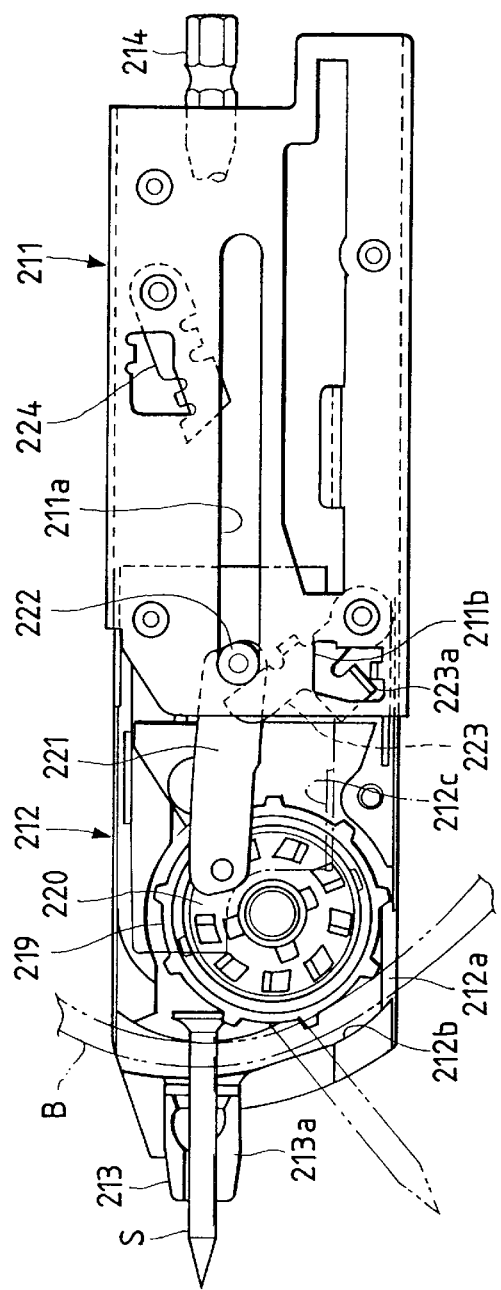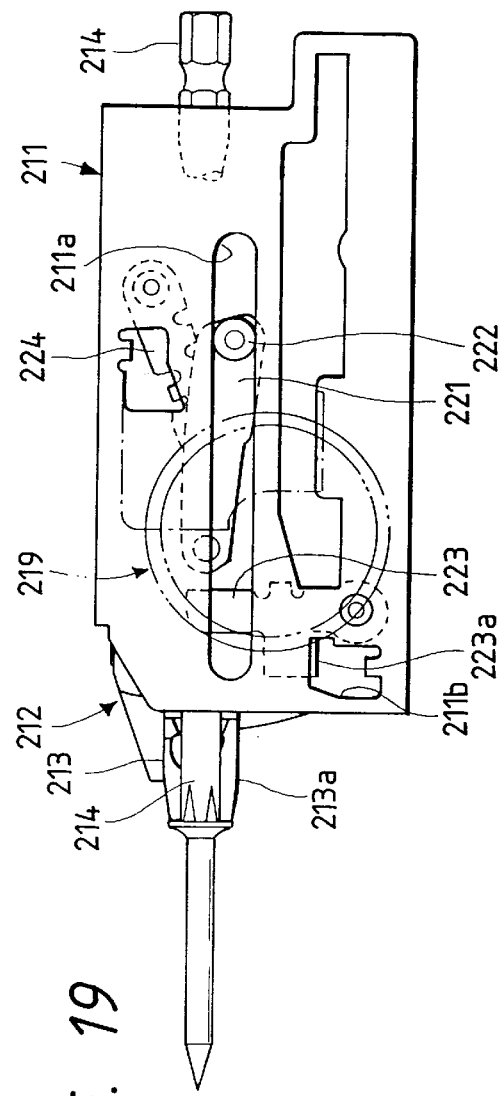

SCREW GUIDE IN LINKED-SCREW TIGHTENER

BACKGROUND OF THE INVENTION

The present invention relates to a screw holding unit in a linked-screw tightener in such a manner as to guide the screw supplied to the screwing position of the linked-screw tightener without tumbling down when the screw is screwed in.

In a typical linked-screw tightener, a guide passage for use in passing and guiding linked screws therethrough is normally formed across the screwing part of a nose portion which is moved relative to the screw tightener body. The linked-screw guide passage is situated in a position where the leading end of the screw is not allowed to stick out of the leading edge face of the nose portion on the leading end side of the nose portion. Further, a pair of chuck pawls are disposed across the guide passage in the screwing part thereof, so that the foremost one of the linked screws thus supplied is held therebetween. With the linked-screw tightener thus constructed, any inconvenience arising from the tumbling-down of the screw is obviated because the screw is not caused to stick out of the chuck pawls but held therein.

In a case where the leading end of a screw is driven in by aiming at the hole bored in a member to be screwed down like when a house is roofed with tiles, it is needed to stick the screw out of the leading end of a nose portion. Since the tip of the screw is caused to stick out of chuck pawls in that case, however, the screw tends to tumble down when it is screwed in by pushing it on the screw-down member and may therefore be driven in unsatisfactorily. Moreover, a screw following the screw in the drive portion is also caused to stick out as all of the linked screws are arranged on the leading end side of the nose portion. Further, the tip of the second screw bumps against the screw-down member and acquires the habit of bending to a coupling belt and when the second screw is conveyed to the screw drive portion, there occurs an incident in which the tip thereof may fail to reach the center of the chuck pawls.

SUMMARY OF THE INVENTION

An object of the present invention made to obviate the foregoing shortcomings is to provide a screw guide unit for a linked-screw tightener such that a foremost screw among the linked screws is guided before being screwed in a right posture while held into position in a nose portion.

Further object of the present invention is to solve the foregoing problems of feeding screws with greater certainty by obviating a cause of screw supply failure.

Still further object of the present invention is to solve the foregoing problems arising from preventing the screw-tightening failure caused by the falling-down of screws.

In order to accomplish the above objects, a first aspect of the present invention provides a screw guide unit for a linked-screw tightener in which linked screws held by a coupling belt at predetermined intervals is passed through a linked-screw guide passage provided near a leading end of and across a nose portion installed movably at the leading end of a linked-screw tightener body relative to a screwing direction, a foremost screw is fed into an open space between a pair of chuck pawls positioned in the substantially central part of the nose portion and capable of opening and closing in accordance with the movement of the nose portion relative to the linked-screw tightener body, and the supplied screw is driven with a driver bit, the screw guide unit comprising: a foremost screw receiving port formed on the pair of chuck pawls wherein the foremost screw receiving port opens in the chuck pawls closing condition to allow the foremost screw to be fed into the open space between the pair of the chuck pawls; and a guide member disposed at the pair of the chuck pawls, for opening and closing the foremost receiving port to hold the foremost screw at the pair of the chuck pawls, wherein the guide member operates together the movement of the nose portion relative to the linked-screw tightener body.

A second aspect of the present invention provides the screw guide unit according to the first aspect., wherein the guide member performs opening and closing operations along the foremost screw receiving port.

A third aspect of the invention provides, in a screw tightener includes: a nose holder; a nose block fitted to the nose holder in the screw tightener, the nose block being slidable within a predetermined range in the direction in which the linked screws are driven, the nose block being urged by means of a spring in the direction in which the nose block sticks out; a screw feed unit using linked screws inserted in a coupling belt at predetermined intervals in its longitudinal direction, the screw feed unit including, a ratchet wheel is accommodated in the nose block for feeding the linked screws, a ratchet feed mechanism connects the ratchet wheel with the nose block so as to rotate the ratchet wheel by a predetermined angle in one direction when the nose block sticks out; and a screw guide unit including a screw-receiving port by opening one side of a screw chuck fitted to the leading end of the nose block together with the nose holder so as to introduce the shanks of the linked screws into the screw chuck, a shutter lever for opening and closing the screw-receiving port of the screw chuck, and a cam mechanism over the shutter lever and the nose holder so as to make the shutter lever open and close the screw-receiving port of the screw chuck in a fashion interlocked with the reciprocation of the nose block: the screw feed unit characterized in that a guide groove formed on the nose holder in parallel to the direction in which the nose block reciprocates, the guide roller engages with the guide groove by fitting the guide roller to one end of a link, the other end of the link engages with the ratchet mechanism of the ratchet wheel, a lever is pivotally fitted to the nose holder, the lever is slidable within a predetermined range in the longitudinal direction of the nose holder, the lever is forced to contact the front side of the guide roller by providing a spring over the lever, and a stopper attached to the nose block so as to regulate the forward swinging of the lever, wherein the stopper is set long enough to regulate the swinging of the lever in the first-half extension stroke of the nose block and to release the lever from being thus regulated in the second-half extension stroke thereof.

A fourth aspect of the invention provides the screw feed unit of the linked-screw tightener is characterized in that a guide groove is formed on the nose holder in parallel to the direction in which the nose block reciprocates, the guide roller is attached to the guide groove by fitting the guide roller to one end of a link, the other end of the link engages with the ratchet mechanism of the ratchet wheel, a lever is pivotally attached to the nose holder, the lever is slidable within a predetermined range in the longitudinal direction of the nose holder, the leading end portion of the lever is forced to contact the front side of the guide roller by providing a spring over the lever, and the torsion torque of the lever is set greater than the torque required to revolve the ratchet wheel but smaller than the stretching force of the spring installed over the nose holder and the nose block.

A fifth aspect of the invention provides, in a linked-screw tightener including: a nose holder; a nose block is fitted to the nose holder in the linked-screw tightener, the nose block being slidable within a predetermined range in the direction in which the linked screws are driven, the nose block being urged by means of a spring in the direction in which the nose block sticks out; a screw feed unit in which a coupling belt at predetermined intervals in its longitudinal direction, the screw feed unit including a ratchet wheel accommodated in the nose block for feeding the linked screws, and a ratchet feed mechanism over the ratchet wheel and the nose block so as to turn the ratchet wheel by a predetermined angle in one direction when the nose block sticks out; and a screw guide unit having a screw-receiving port by opening one aside of a screw chuck fitted to the leading end of the nose block together with the nose holder so as to introduce the shanks of the linked screws into tho screw chuck, a shutter lever for opening and closing the screw-receiving port of the screw chuck, and a cam mechanism over the shutter lever end the nose holder so as to make the shutter lever open and close the screw-receiving port of the screw chuck in a fashion interlocked with the reciprocation of the nose block, the screw guide unit characterized in that a cam groove having a parallelogram loop formed on the side of the nose holder, the intermediate portion of the shutter level for opening and closing the screw-receiving port is pivotally attached to the side of the nose block, the rear end portion of the shutter lever is engaged with the cam groove so as to make the rear end portion of the shutter lever move in cycles along the loop-shaped cam groove when the nose block reciprocates, and the shape of the loop of the cam groove and the direction in which the shutter lever moves in cycles are set so that the shutter lever starts to swing at the last stage of each of the contraction and extension strokes of the nose block.

According to the first aspect of the present invention, the leading end of the nose portion is pressed against the screw-down member and pushed in the screw tightener body in such a state that the foremost screw out of the linked screws is supplied to the drive portion of the nose portion before being held by the pair of chuck pawls, when the diver bit is caused to relatively move forward and engages with the head groove of the foremost screw held by the chuck pawls, whereby the screw is screwed in the screw-down member.

When the nose portion is separated from the screw-down member after the screwing operation is performed, the nose portion is caused to move relative to the screw tightener body and the foremost one of the linked screws is interlockingly conveyed into the open space between the pair of chuck pawls and further the guide member interlockingly closes the open space.

When the foremost one of the linked screws is thus conveyed in between the chuck pawls, the guide member operates to close the opening between the chuck pawls so as to make the screw held by the chuck pawls move in a direction opposite to the direction in which it is conveyed. The screw is therefore held along the screw passage portion to prevent it from tumbling down to ensure that it is screwed in by the diver bit.

According to the second aspect of the present invention, the guide member operates to open and close the screw passage portion along the screw passage portion. Consequently, the guide member swings in such a manner as to convey the foremost one of the linked screws in between the chuck pawls when the guide member closes the opening.

According to the third and fourth aspects of the invention, the screw feed unit causes the ratchet wheel with pawls to almost complete the feeding of the screw in the first-half extension stroke of the nose block. Consequently, the screw head has already been inserted into the nose block at the point of time the shutter lever starts to swing toward the closing direction in the midst of the extension stroke even in the case where the screw is titled with the shank situated outside to ensure that the shutter lever surely catches the screw and introduces it into the screw chuck.

BRIEF DESCRIPTION OF THE DRAWINGS

FIG. 3($a$) is a top view of the principal part of the above guide unit with the omission of detailed illustration of a feed wheel and so on;

FIG. 3($b$) is an elevational view of the nose portion of the above guide unit;

FIG. 4($b$) is an elevational view illustrating the condition in which the above unit is in operation;

FIG. 5($b$) is an elevational view illustrating the condition in which the above unit is in operation;

FIG. 6 is a partial cutaway side view of a screw feed unit according to a second embodiment of the present invention;

FIG. 7 is a partial cutaway side view showing the operating condition of the screw feed unit of FIG. 6;

FIG. 11($b$) is a side view of a linked screw;

FIG. 14 is a partial cutaway side view a screw feed unit according to a third embodiment of the present invention;

FIG. 15 is a partial cutaway side view showing the operating condition of the screw feed unit of FIG. 14;

FIG. 16 is a partial cutaway side view of a screw guide unit including the nose portion of a linked-screw tightener according to the present invention;

FIG. 17 is a partial cutaway side view showing the operating condition of the screw guide unit of FIG. 16;

FIG. 18 is a partial cutaway side view showing the nose block of a screw feed unit;

FIG. 19 is a partial cutaway side view showing the operating condition of the screw feed unit of FIG. 18;

DETAILED DESCRIPTION OF THE PREFERRED EMBODIMENTS

Figure 1:
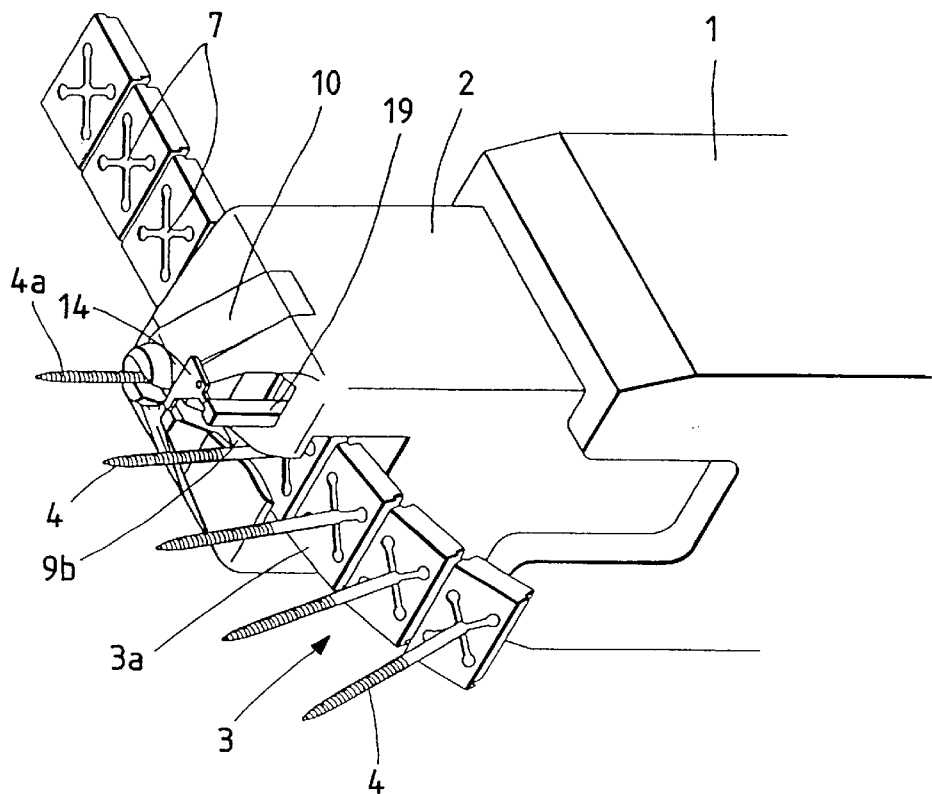
FIG. 1 is a perspective view of the principal part of a screw guide unit in a linked-screw tightener embodying the present invention.

FIG. 1 is a perspective view of the leading end portion of a linked-screw tightener embodying the present invention.

Figure 2:
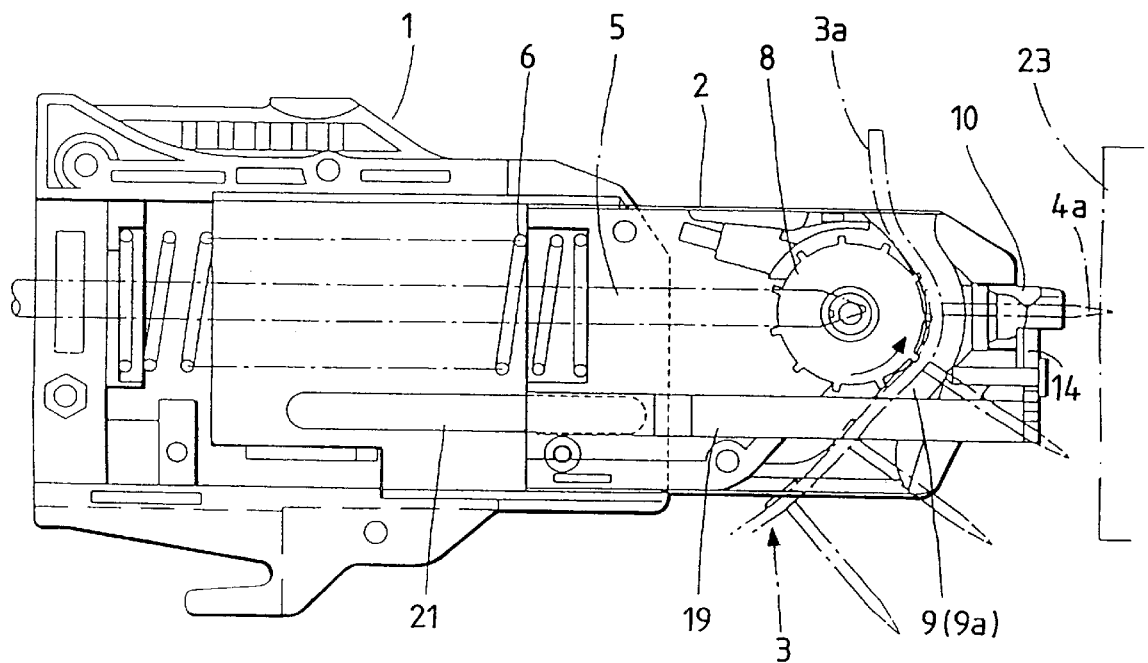
FIG. 2 is a side view of the principal part of the above guide unit.

This screw tightener is fitted with a nose portion 2 at the leading end of the nose holder 1 of the screw tightener body in such a manner that the nose portion 2 is movable relative to the direction in which a screw is pushed, and is used for guiding and supplying a foremost screw 4a out of linked screws 3 to the drive portion of the nose portion 2, so that the foremost screw 4a thus supplied can be engaged by a driver bit 5 (see FIG. 2). Incidentally, the nose portion 2 is always so urged by a spring 6 as to stick out of the nose holder 1.

Holding holes 7 each for use in holding screws 4 are formed at predetermined intervals in the longitudinal direction of a plastic coupling belt 3a, which is rectangular in cross section. The linked screws 3 are, as shown in FIG. 2, engaged with a feed wheel 8 provided in the nose portion 2 and when the nose portion 2 is moved to stick out of the nose holder 1 after one of the linked screws 3 is screwed in, the feed wheel 8 turns interlockingly by a predetermined angle so as to feed in another screw. In this embodiment, a known screw feed mechanism may be employed.

A guide passage 9 for use in guiding and inserting the linked screws 3 therethrough is provided near the leading end of the nose portion 2 to set the guide passage 9 across the nose portion 2 (from down to up). A coupling-belt passage portion 9a for guiding the coupling belt 3a and a screw passage portion 9b for guiding and supplying screws constitute the guide passage 9, the screw passage portion 9b being opened at the leading end of the nose portion 2.

Figure 3A:
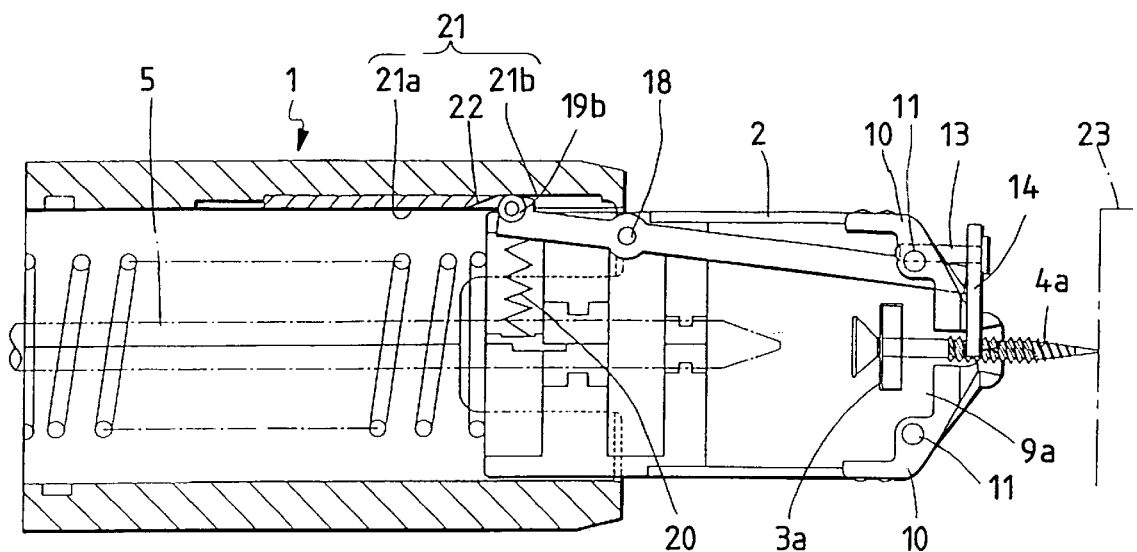
Figure 3B:
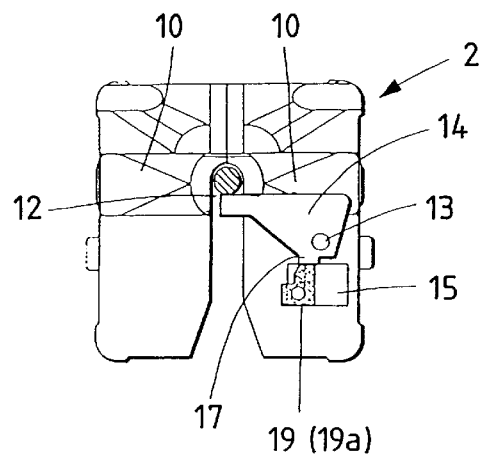

As shown in FIGS. 2, 3(a) and 3(b), further, the drive portion is positioned in the substantially central part of the nose portion 2 and formed with a pair of chuck pawls 10 with the guide passage 9 located therebetween. The chuck pawls 10 are supported so that they can be opened and closed laterally with respect to support shafts 11 each provided on the left and right sides of the guide passage 9 and urged by a spring in the closing direction. As shown in FIG. 3(b), further, there is formed an open space 12 for use in holding the screw against the insides of the closing faces of both chuck pawls 10. Although the upper portion (on the linked-screw discharging side) of the screw-holding space 12 is in the form of a closed end, whereas the lower portion thereof (the side onto which the foremost screw 4a is supplied) is open.

Further, a guide member 14 is pivotally supported by a shaft 13 near the screw passage portion 9b to the leading edge face of the nose portion 2. The guide member 14 is made revolvable from a position (the position shown in FIG. 3(b)) where it closes the screw passage portion 9b up to a position (the position shown in FIG. 5(b)) where it opens the screw passage portion 9b. The guide member 14 is normally so urged by a spring (not shown) fitted to the shaft 13 as to move away from the screw passage portion 9b. Further, the guide member 14 is adapted to operate along the screw passage portion 9b and when it pivots toward the closing position, its one side closes a lower opening 16 between the chuck pawls 10. A protrusion 17 is formed on the other side of the guide member 14.

The operation of opening and closing the open space by means of the guide member 14 is interlocked with the movement of the nose portion 2 relative to the screw tightener body. More specifically, a shaft 18 (see FIG. 3(a)) is vertically installed within the nose portion 2 and an operating lever 19 is fitted to the shaft 18 so that it is capable of swinging from side to side. One end 19a(forward end) of the operating lever 19 projects outward through an opening 15 at the leading end of the nose portion 2 and mates with the protrusion 17 of the guide member 14. On the other hand, the other end 19b (a roller at the rear end) of the operating lever 19 is urged by a spring 20 so that it is kept projecting outward and engages with a guide groove 21 formed in the longitudinal direction of the inner wall of the nose holder 1. The guide groove 21 is, as shown in FIG. 2 and FIG. 3(a), formed into a two-stepped groove including a shallow groove portion 21a and a deep groove portion 21b in the thick-wall direction of the aforesaid inner wall via a tilted face 22. The rear end 19b of the operating lever 19 is forced into the deep groove portion 21b of the guide groove 21 when the nose portion 2 has been pushed out completely from the nose holder 1 (in such a state as shown in FIG. 3(a)).

Figure 4A:
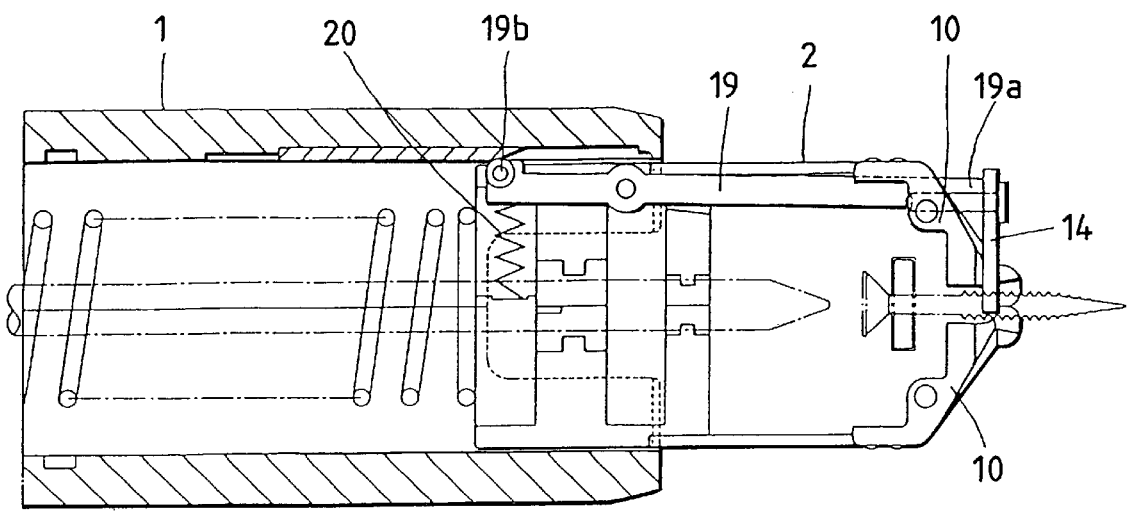
FIG. 4($a$) is a top view illustrating a condition in which the above guide unit is in operation.
Figure 4B:
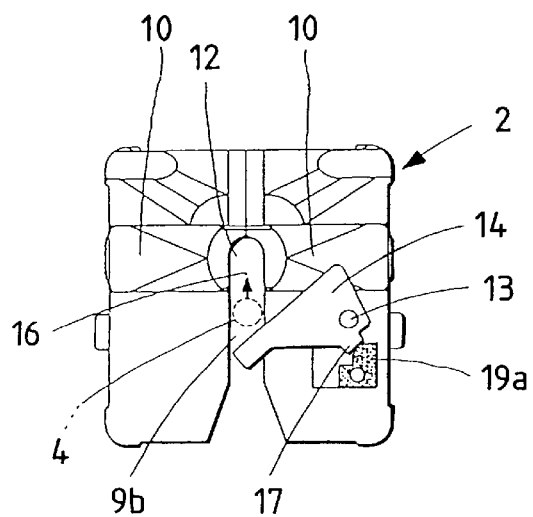
Figure 5A:
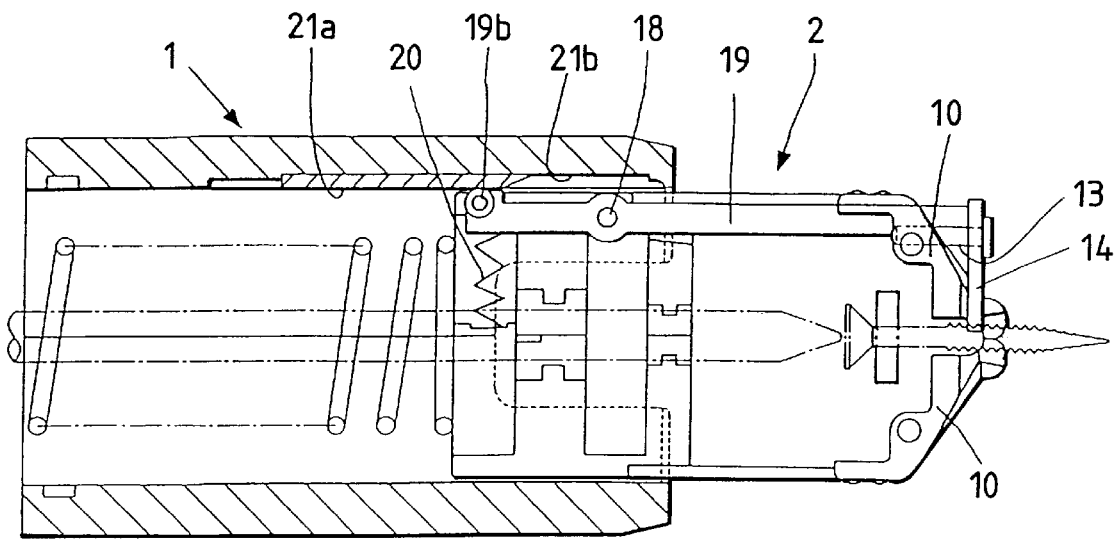
FIG. 5($a$) is a top view illustrating a condition in which the above guide unit is in operation.
Figure 5B:
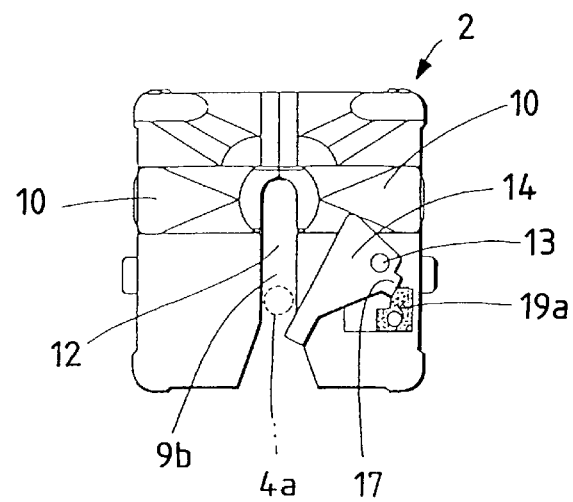
Figure 8:
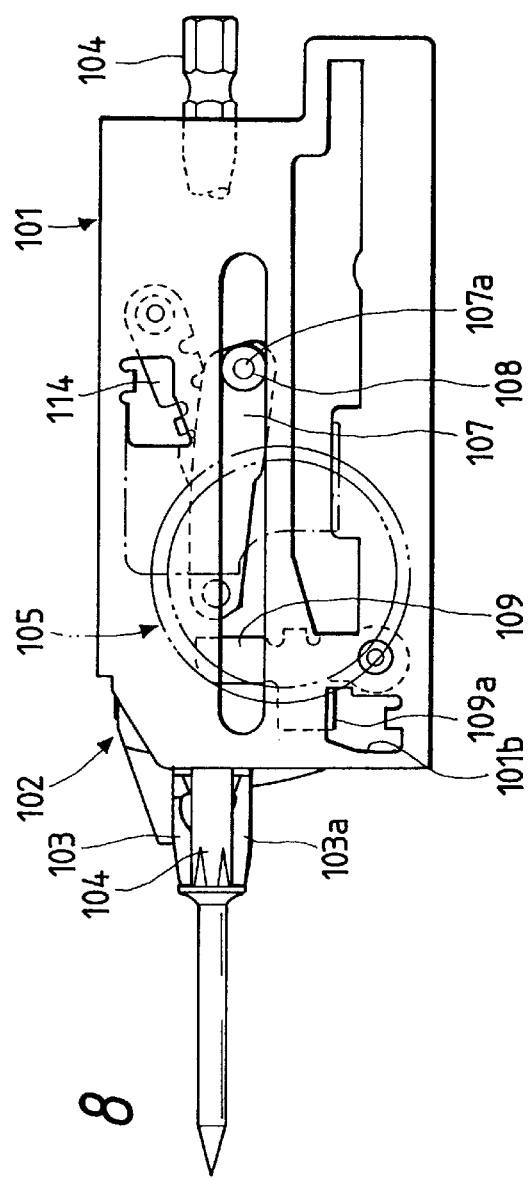
FIG. 8 is a partial cutaway side view showing the operating condition of the screw feed unit of FIG. 6.

A description will subsequently be given of the operating mode of the screw guiding unit thus constructed. While the foremost screw 4a is held by the chuck pawls 10, the leading end of the nose portion 2 is pressed against a member 23 to be screwed down and when the nose portion 2 is forced into the screw tightener body, the driver bit 5 is caused to relatively move forward and engages with the head groove of the foremost screw 4a held by the chuck pawls 10. Further, the driver bit 5 removes the foremost screw 4a from the coupling belt 3a, pushes the screw 4a ahead of the nose portion 2 and screws it into the screw-down member 23. In case, the guide member 14 keeps the opening 16 closed since the rear end 19b of the operating lever 19 is located in the deep groove portion 21b in the initial screwing state (of FIG. 3(a)). As the nose portion 2 moves as shown in FIGS. 4(a) and 5(a), the rear end 19b of the operating lever 19 slides from the deep groove portion 21b to the shallow groove portion 21a against the force of the spring 20 and the operating lever 19 swings to the extent that its forward end escapes laterally from the protrusion 17 of the guide member 14, whereas the guide member 14 becomes urged by the spring to swing and moves back from the screw passage portion 9b as shown in FIGS. 4(b) and 5(b).

When the nose portion 2 is moved away from the member after the screw has been screwed therein, the screw feed mechanism operates because of their relative movement and the linked screws 3 are subsequently fed in screw by screw. On the termination of that movement once, the rear end 19b of the operating lever 19 is then moved from the shallow groove portion 21a to the deep groove portion 21b of the guide groove 21, whereby the operating lever 19 is caused to swing laterally as shown in FIG. 5(a), FIG. 4(a) and FIG. 3(a) in this order. Further, the forward end of the operating lever 19 swings the guide member 14 to close the opening 16 as shown in FIG. 5(b), FIG. 4(b) and FIG. 3(b) in this order. When the guide member 14 closes the opening 16, it swings so as to feed the foremost screw 4a of the linked screws 3 into the opening 16 formed by the chuck pawls 10; that is, one side of the guide member 14 reaches the position where the opening 16 between the chuck pawls 10 is closed. Then the three sides (upper and lateral sides) of the peripheral face of the foremost screw 4a are blocked by the chuck pawls 10, whereas the remaining opening 16 is closed by the guide member 14. In this way, the foremost screw 4a is held in between the chuck pawls 10. While the foremost screw 4a is thus held immediately after the screwing operation is performed, it is guided to a member to be screwed down and the guide member 14 is caused to swing and move away from the screw passage as stated above when the operating lever 19 swings again in the opposite direction.

As set forth above, the guide member 14 swings when the foremost screw 4a is fed in, so that the leading end of the screw is conveyed and guided into the opening 16 between the chuck pawls 10 before being held therein. The opening 16 between the chuck pawls 10 is closed after the feeding of the foremost screw 4a is completed and the screw thus held by the chuck pawls 10 is moved in a direction opposite to the direction in which the screw is fed, and guided along the screw passage portion 9b in such a manner as to set the screw free from tumbling down.

FIGS. 6 to 10 inclusive show a screw feed unit according to a second embodiment wherein a nose holder 101 is secured to a mechanism housing with a grip in a linked-screw tightener. A nose block 102 is slidably and idly fitted in the nose holder 101 and a compression coil spring (not shown) is installed over the mechanism housing and the nose block 102, the nose block 102 being urged in the direction in which it sticks out of the nose holder 101. A screw chuck 103 comprises two parts disposed in the lateral direction and is pivotally fitted to the leading end portion of the nose block 102 and laterally expanded by a screw head moving forward in the screw chuck 103 when the screw is tightened though usually urged by a spring (not shown) in the closing direction.

Screw-receiving ports 102a and 103a are each opened in the undersides of the nose block 102 and the screw chuck 103, and the screw guide passage 102b of the nose block 102 is formed vertically across the passage of a driver bit 104. The driver bit 104 is coupled to a rotary drive mechanism operated by an electric motor in the mechanism housing (not shown).

Figure 11A:
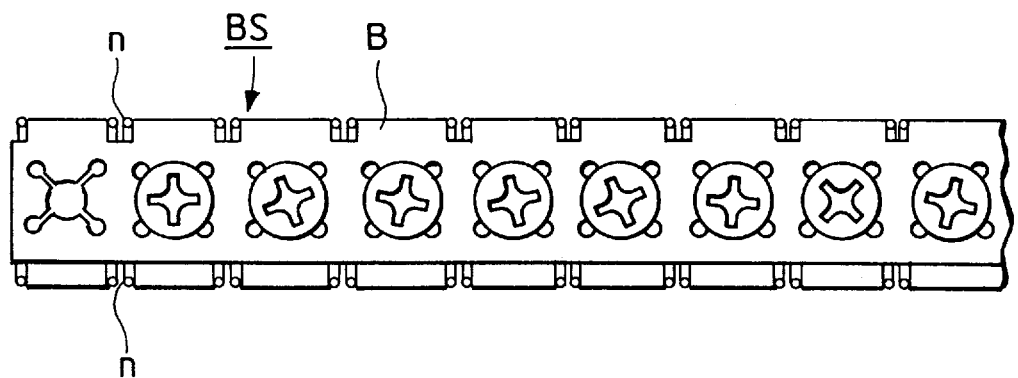
FIG. 11($a$) is a top view of linked screws.

A ratchet wheel 105 with pawls is pivotally supported in the nose block 102 and the pawls of the ratchet wheel 105 each engage with notches n provided for linked screws BS at predetermined intervals in a plastic belt B as shown in FIG. 11(a), so that the linked screws BS are fed from downside to upside.

The ratchet wheel with pawls 105 is a known toothed wheel provided with feed pawls on the outer periphery and ratchet pawls arranged radially at predetermined angles on the side face. There is also coaxially and idly installed a disc 106 therein with holes arranged radially and symmetrically relative to the respective ratchet pawls. The disc 106 is urged by a spring (not shown), whereby it is forced to contact the side of the ratchet wheel 105 and by longitudinally reciprocating the disc 106 with a link 107 pivotally fitted thereto, the ratchet wheel 105 with pawls in reference to FIG. 6 turns clockwise intermittently by a predetermined angle.

A roller shaft 107a is projected from the side of the other end portion of the link 107 and a guide roller 108 is fitted to the roller shaft 107a. A guide groove 101a in parallel to the sliding direction of the nose block 102 is provided in the nose holder 101, the guide roller 108 engaging with the guide groove 101a.

Further, a lever 109 is pivotally supported near the forward lower end of the nose holder 101, and a hook 109a projecting sidewise is provided in the intermediate portion between the vertical ends of the lever 109. While the hook 109a engages with a hole 101b bored in the side plate of the nose holder 101, the hole 101b limits the forward swing range of the lever 109 to only a predetermined angle from its upright position. The lever 109 is urged by a spring (not shown) toward the stand-up direction and the back side of the upper end portion thereof is forced to contact the front side of the guide roller 108 of the link 107.

Further, a stopper 102c for regulating the movement of the lever 109 in the extension stroke of the nose block 102 is formed in the intermediate portion between the longitudinal ends of the nose block 102. The stopper 102c is a bent portion situated at a level corresponding to the underside of the hook 109a of the lever 109 in the upright state and also set in parallel to the sliding direction of the nose block 102.

Figure 12:
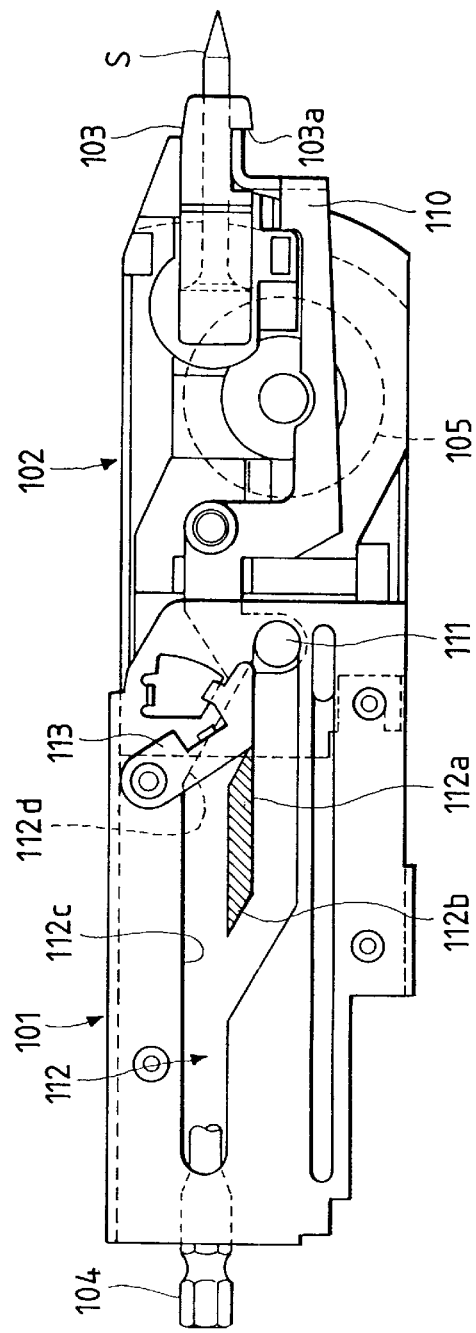
FIG. 12 is a partial cutaway side view showing a shutter mechanism.

FIG. 12 is a side view of the other side of the nose holder 101 together with the nose block 102, wherein a shutter lever 110 is pivotally fitted to the side of the intermediate portion between the longitudinal ends of the nose block 102 and a guide roller 111 which is fitted to the side of the rear end portion of the shutter lever 110 and engages with a cam groove 112 formed in the side of the nose holder 101. Although the shutter lever 110 is usually urged by a torsion coil spring (not shown) in the direction in which the screw-receiving port 3a of the screw chuck 103 is opened (clockwise in FIG. 12), it is so positioned as to close the screw-receiving port 103a in the initial state as shown in FIG. 12. The shutter lever 110 is driven to reciprocate along the cam groove 112 during the time the nose block 102 reciprocates so as to open and close the screw-receiving port 103a.

As shown in FIG. 12, the cam groove 112 is in the form of a hysteresis loop, that is, a parallelogram for differentiating between the incoming and outgoing routes of the guide roller 111. A one-way shutter lever 113 is pivotally fitted to the forward part of the nose holder 101 and the leading end portion of the one-way shutter lever 113 is used to close the forward tilted side 112d of the cam groove 112 for the purpose of guiding the guide roller 111 from the initial position to the bottom side 112a of the cam groove during the time the nose block 102 retracts.

When the nose block 102 is made to retract, the guide roller 111 of the shutter lever 110 moves back along the bottom side 112a of the cam groove 112, ascends along the backward tilted side 112b in the intermediate portion and proceeds to the rear end portion of the upper side 112c. On its way back the guide roller 111 then moves forward along the upper side 112c, descends along the forward tilted side 112d while pressing the back side of the one-way shutter lever 113 and returns to the initial position by retracting the one-way shutter lever 113 from the route.

Figure 13:
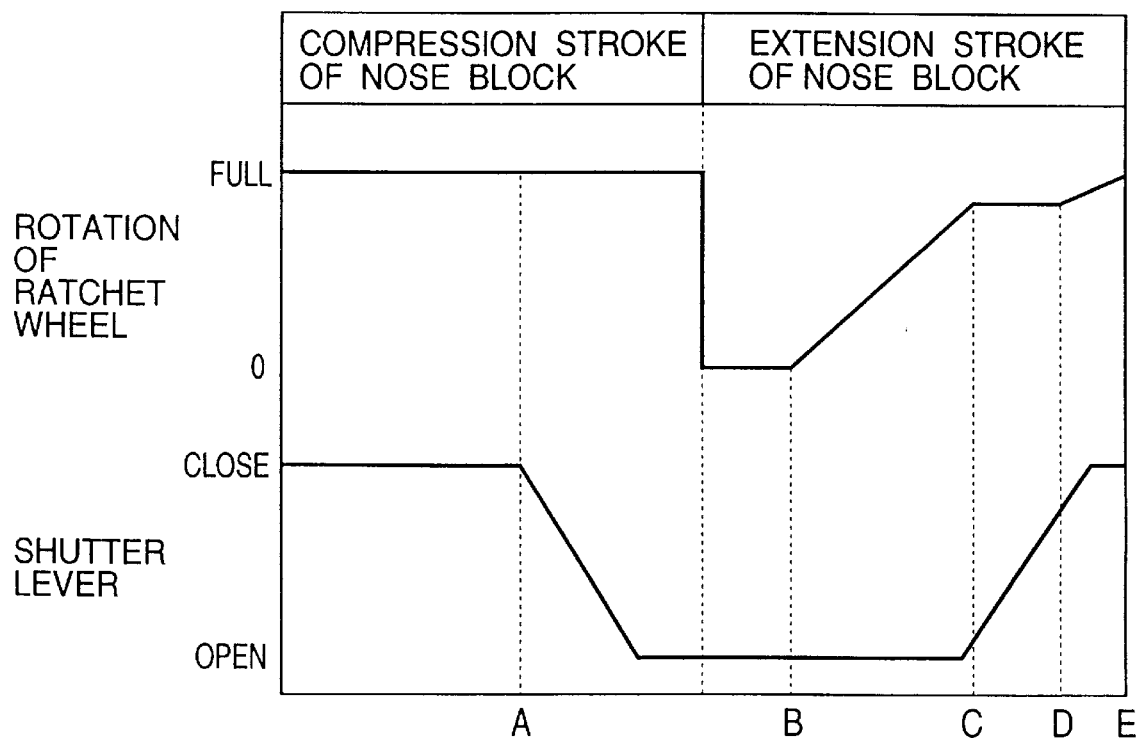
FIG. 13 is a timing chart of the ratchet wheel with pawls and the shutter lever of the screw feed unit of FIG. 6.

A description will subsequently be given of the operation of the screw feed unit. FIG. 13 shows a timing chart showing the operating timing of the ratchet wheel 105 with pawls and the shutter lever 110.

In the initial state shown in FIG. 6 first, the nose block 102 which is urged by the compression spring remains to stick out, whereas the lever 109 is tilted forward as it is pressed by the guide roller 108 of the link 107. A screw S (threads have been omitted in FIG. 6) held by the screw chuck 103 is then pressed against a workpiece and the driver bit 104 is started to push in the nose block 102. The guide roller 108 of the link 107 is then moved back along the guide groove 101a and the lever 109 is uprighted.

Further, the shutter lever 110 starts turning in the opening direction (A in FIG. 13) when the nose block 102 is driven in as the operation of tightening the screw proceeds and the guide roller 108 abuts against a stopper 114 installed in the nose holder 101 before being stopped from moving back once. Then the disc 106 coaxial with the ratchet wheel 105 with pawls is pressed via the link 107 and caused to turn counterclockwise. Further, the disc 106 runs on the ratchet pawl of the ratchet wheel 105 with pawls at a standstill and engages with the next ratchet pawl.

Figure 9:
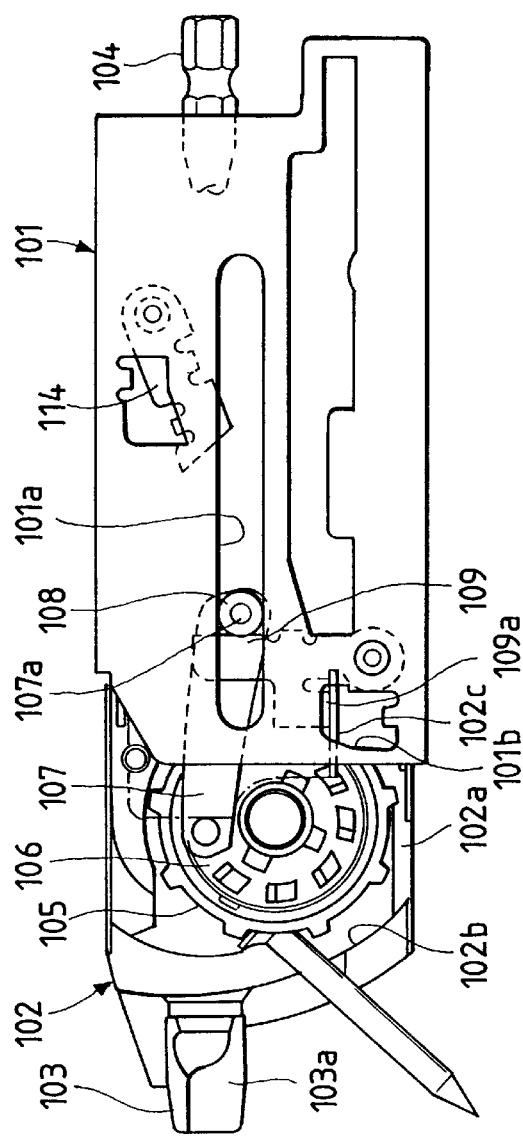
FIG. 9 is a partial cutaway side view showing the operating condition of the screw feed unit of FIG. 6.

The screw tightener is lifted up from the workpiece after the termination of the screw-tightening operation and when the nose block 102 urged by the compression spring is subjected to the extension stroke, the lever 109 abuts against the guide roller 108 of the link 107 (B in FIG. 13) and is forced to move forward as shown in FIG. 9; however, it is prevented from turning forward because the hook 109a abuts against the stopper 102c of the nose block 102. Thereby the link 107 is drawn back via the guide roller 108 abutting against the back side of the lever 109 and the disc 106 is caused to turn clockwise. Then the ratchet 105 wheel with pawls turns interlockingly with the effect of feeding in the linked-screws engaging with the pawls of the ratchet wheel 105 with pawls.

Figure 10:
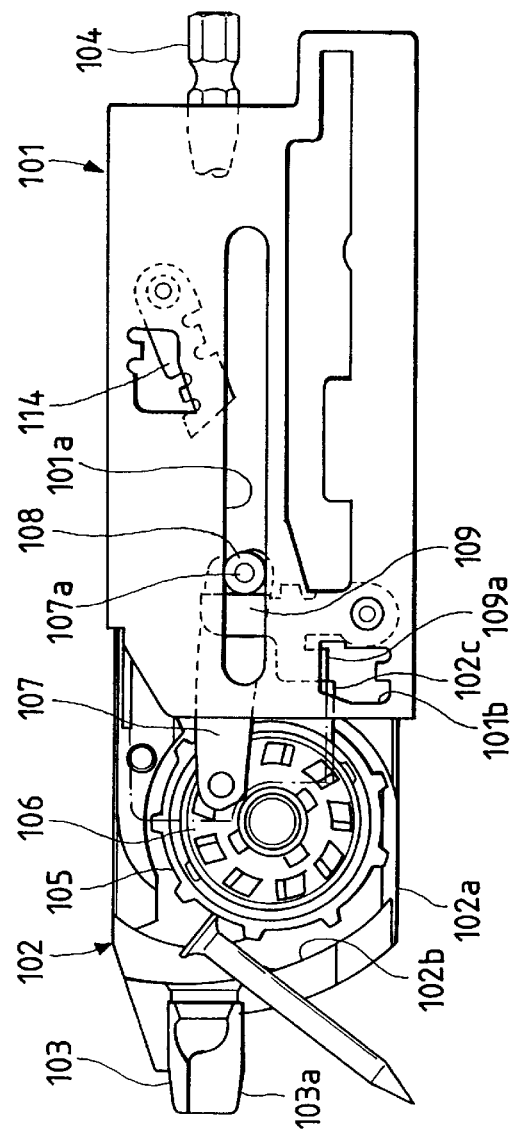
FIG. 10 is a partial cutaway side view showing the operating condition of the screw feed unit of FIG. 6.

Further, the hook 109a of the lever 109 passes by the position of the stopper 102c and releases the lever 109 from engaging with the stopper 102c immediately after the state shown in FIG. 10 (C in FIG. 13). The lever 109 is then pressed by the guide roller 108 and tilted forward, so that the disc 106 and the ratchet wheel 105 with pawls are set free from turning. Moreover, the shutter lever 110 substantially simultaneously starts turning in the closing direction. The guide roller 108 abuts against the forward edge portion of the guide groove 101a and is drawn immediately before the standby position shown in FIG. 6 is restored (D in FIG. 13) and the disc 106 and the ratchet wheel with pawls 105 are made to stop at a predetermined position (E in FIG. 13).

As shown in FIG. 13, the feeding of the screw by means of the ratchet wheel 105 with pawls is substantially terminated at the point of C when the closing stroke of the shutter lever 110 is entered in the extension stroke after the termination of the operation of tightening the screw. Even in a case where the forward movement of the shank of the screw is slower than that of the screw head because the screw introduced into the screw-receiving port is in a tilted posture, the timing at which the screw is fed precedes to a considerable extent the timing at which the closing of the shutter lever 110 is started to ensure that the shutter lever 110 introduces the shank of the screw into the screw chuck 103.

Figure 11B:
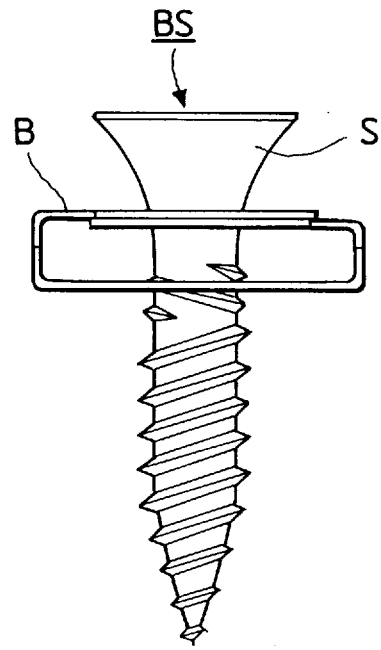

A description will subsequently be given of a screw feed unit according to a third embodiment by reference to FIGS. 14 and 15. As shown in FIG. 14, the link 107 pivotally fitted to the disc 106 of the ratchet wheel 105 with pawls is engagable with the guide groove 101a of the nose holder 101 as in the case of the second embodiment. However, a torsion coil spring 122 affixed to a lever 121, instead of the stopper 102c for regulating the swinging of the lever 109 shown in FIG. 11, is employed for carrying out the same function as the second embodiment.

The torsion coil spring 122 of FIG. 14 is kept urging the lever 121 clockwise and the torsion torque of the lever 121 by means of the torsion coil spring 122 is greater than what is required to revolve the ratchet wheel 105 with pawls and set smaller in value than the stretching force of the compression spring installed over the nose holder 101 and the nose block 102.

In the initial state shown in FIG. 14, the lever 121 is pressed by the guide roller 108 of the link 107 coupled to the nose block 102 which remains to stick out and tilted forward, whereas the lever 121 is uprighted up to the perpendicular position as the nose block 102 retracts in the screw-tightening stroke in which the nose block 102 is caused to retract as in the case of the second embodiment.

With the extension stroke of the nose block 102 which follows the termination of the screw-tightening operation, the back side of the upright lever 121 abuts against the guide roller 108, thus causing the link 107 to be drawn. The ratchet wheel 105 with pawls then turns to feed the screw.

The lever 121 is caused by the stretching force of the compression spring to swing forward via the guide roller 108 after the ratchet wheel 105 with pawls revolves and as shown in FIG. 14, the guide roller 108 abuts against the forward end portion of the guide groove 101a to stop the nose block 102.

FIGS. 16 and 17 show a screw guide unit of the type shown in FIG. 12 wherein a nose holder 211 is secured to a mechanism housing with a grip in a linked-screw tightener. A nose block 212 is slidably and idly fitted in the nose holder 211 and a screw chuck 213 comprising two parts disposed in the lateral direction is pivotally fitted to the leading end portion of the nose block 212. A driver bit 214 provided in the nose holder 211 is coupled to a rotary drive mechanism operated by an electric motor in a mechanism housing (not shown). A compression coil spring (not shown) is installed over the mechanism housing and the nose block 212, the nose block 212 being urged in the direction in which it sticks out of the nose holder 211.

Screw-receiving ports 212a and 213a are each opened in the undersides of the nose block 212 and the screw chuck 213, and the screw guide passage 212b of the nose block 212 is formed vertically across the passage of a driver bit 214. The screw chuck 213 laterally expanded by a screw head moving forward in the screw chuck 213 when a screw is tightened though usually urged by a spring (not shown) in the closing direction.

A shutter lever 215 is pivotally fitted to the side of the intermediate portion between the longitudinal ends of the nose block 212 and a guide roller 216 which is fitted to the side of the rear end portion of the shutter lever 215 and engages with a cam groove 217 formed in the side of the nose holder 211. Although the shutter lever 215 is usually urged by a torsion coil spring (not shown) in the direction in which the screw-receiving port 213a of the screw chuck 213 is opened (clockwise in FIG. 16), it is so positioned as to close the screw-receiving port 213a in the initial state as shown in FIG. 16.

As shown in FIG. 16, the cam groove 217 is in the form of a parallelogram loop and the guide roller 216 moves in cycles through the cam groove 217 clockwise therein. A one-way shutter lever 218 is pivotally fitted to the forward part of the nose holder 211 and the leading end portion of the one-way shutter lever 218 is used to close the forward tilted side 217d of the cam groove 217 for the purpose of guiding the guide roller 216 from the initial position to the bottom side 217a of the cam groove during the time the nose block 212 retracts.

When the nose block 212 is slid in the retracting direction, the guide roller 216 of the shutter lever 215 moves back along the bottom side 217a of the cam groove, ascends along the backward tilted side 217b in the intermediate portion and proceeds to the rear end portion of the upper side 217c. On its way back the guide roller 216 then moves forward along the upper side 217c, descends along the forward tilted side 217d while pressing the back side of the one-way shutter lever 218 and returns to the initial position by retracting the one-way shutter lever 218 from the route. The shutter lever 215 follows the reciprocation of the nose block 212 and swings reciprocally so as to open and close the screw-receiving port 213a of the screw chuck 213.

Figure 20:
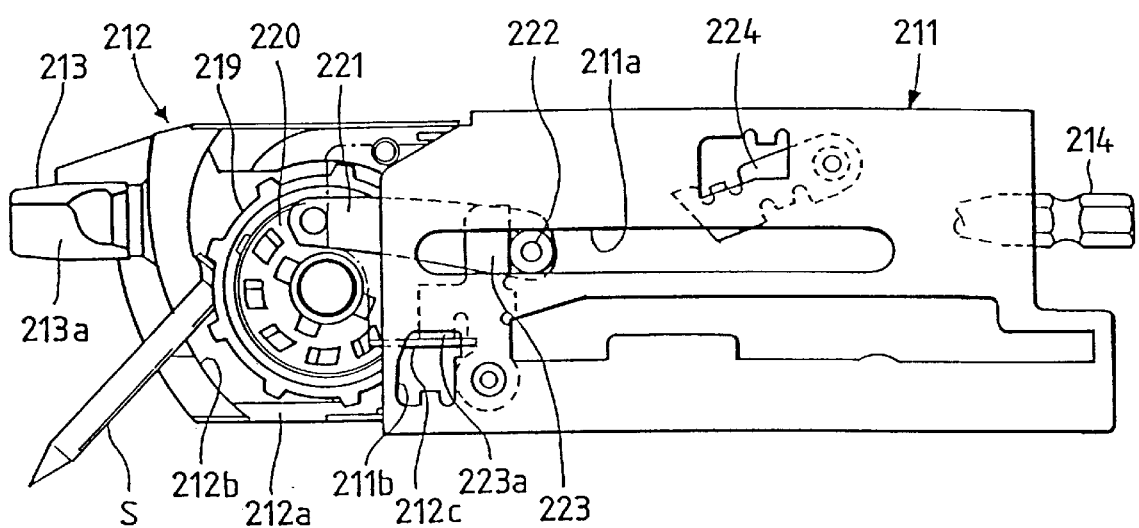
FIG. 20 is a partial cutaway side view showing the operating condition of the screw feed unit of FIG. 18.

FIGS. 18 to 20 inclusive, show a screw feed unit of the type shown in FIGS. 6–10. Pawls of a ratchet wheel 219 with pawls pivotally supported in the nose block 212 each engage with notches n provided for linked screws BS at predetermined intervals in a plastic belt B as shown in FIG. 11(a), so that the linked screws BS are fed from downside to upside.

The ratchet wheel 219 with pawls is a known toothed wheel provided with feed pawls on the outer periphery and ratchet pawls arranged radially at predetermined angles on side face. There is also coaxially and idly installed a disc 220 therein with holes arranged radially and symmetrically relative to the respective ratchet pawls. The disc 220 is urged by a spring (not shown), whereby it is forced to contact the side of the ratchet wheel 219.

One end of a link 221 is pivotally fitted to the disc 220 and a guide roller 222 in the other end portion of the link 221 engages with a guide groove 211a in parallel to the direction in which the nose block 212 provided for the nose holder 211 slides.

Further, a lever 223 is pivotally supported near the forward lower end of the nose holder 211, and a hook 223a projecting sidewise is provided in the intermediate portion between the vertical ends of the lever 223. While the hook 223a engages with a hole 211b bored in the side plate of the nose holder 211, the hole 211b limits the forward swing range of the lever 223 to only a predetermined angle from its upright position. The lever 223 is urged by a spring (not shown) toward the stand-up direction and the back side of the upper end portion thereof is forced to contact the front side of the guide roller 222 of the link 221.

Further, a stopper 212c for regulating the movement of the lever 223 in the extension stroke of the nose block 212 is formed in the intermediate portion between the longitudinal ends of the nose block 212. The stopper 212c is a bent portion situated at a level corresponding to the underside of the hook 223a of the lever 223 in the upright state and also set in parallel to the sliding direction of the nose block 212.

Figure 21:
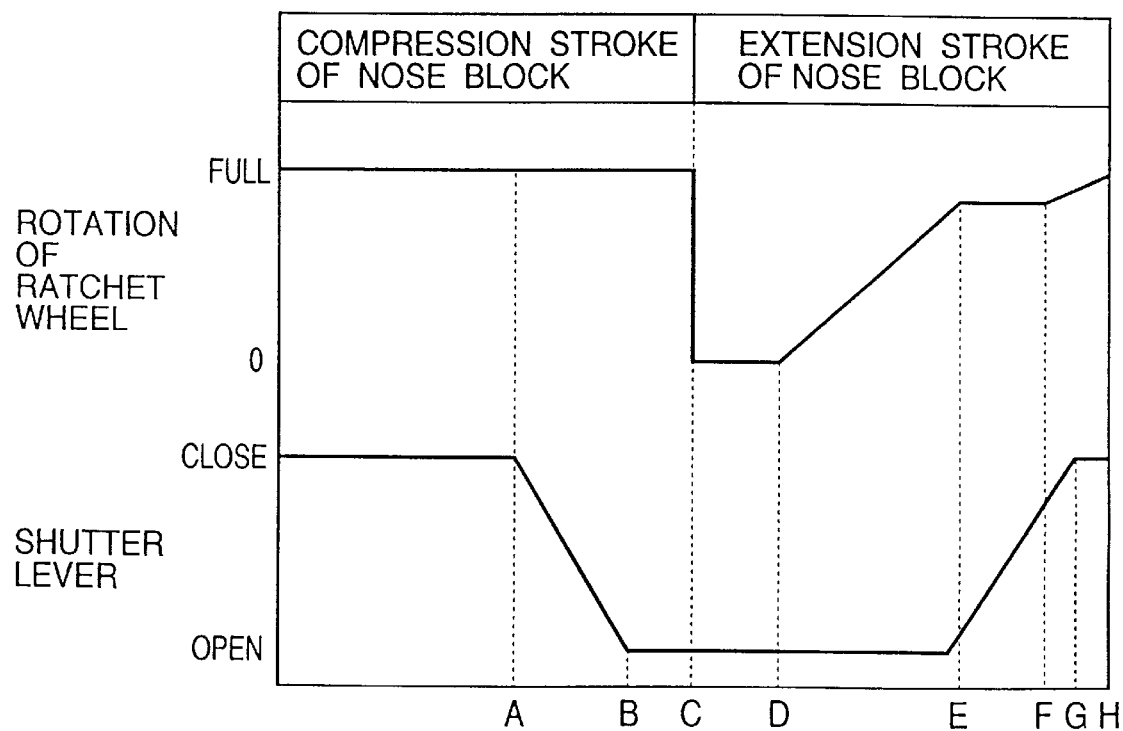
FIG. 21 is a timing chart of a shutter lever and a ratchet wheel with pawls.

Another description will subsequently be given of the operation of the screw guide unit. FIG. 21 shows a timing chart showing the operating timing of the shutter lever 215 and the ratchet wheel 219.

In the initial state shown in FIGS. 16 and 18 first, the nose block 212 which is urged by the compression spring remains to stick out, whereas the lever 223 of the screw feed unit is tilted forward as it is pressed by the guide roller 222 of the link 221. A screw S (threads have been omitted in FIG. 16) held by the screw chuck 213 is then pressed against a workpiece and the driver bit 214 is started to push in the nose block 212. When the guide roller 216 of the shutter lever 215 reaches the backward tilted side 217b of the cam groove, the shutter lever 215 starts to swing in the opening direction (A in FIG. 21).

The shutter lever reaches the upper side 217c of the cam groove immediately before the termination of the contraction stroke (B in FIG. 21) and stops at the opening position as shown in FIG. 17. The guide roller 222 of the screw feed unit abuts against a stopper 224 provided in the nose holder 211 and is stopped from moving back once. The disc 220 coaxial with the ratchet wheel with pawls 219 is pressed via the link 221 so as to turn counterclockwise and as shown in FIG. 19, runs on the ratchet wheel with pawls 219 and engages with the ratchet pawls (C in FIG. 21) after the screw is tightened.

The screw tightener is set afloat from the workpiece after the termination of the screw-tightening operation and when the nose block 212 urged by the compression spring is subjected to the extension stroke, the guide roller 216 of the shutter lever 215 moves forward along the upper side 217c of the cam groove and the shutter lever 215 maintains the opened state. Then the lever 223 of the screw feed unit abuts against the guide roller 222 of the link 221 (D in FIG. 12) and the lever 223 is pressed forward. However, as shown in FIG. 20, the hook 223a abuts against the stopper 212c of the nose block 212 and the lever 223 is stopped from swinging forward. Thus the link 221 is drawn back via the guide roller 222 abutting against the back side of the lever 223 and the disc 220 is turned clockwise, thus causing the ratchet wheel with pawls 219 to be interlocked, whereby one of the linked screws engaging with the pawls of the ratchet wheel 219 is fed.

Then the hook 223a of the lever 223 passes by the stopper 212c after the state shown in FIG. 20, thus releasing the lever 223 from engaging with the stopper 212c (E in FIG. 12), so that the disc 220 and the ratchet wheel with pawls 219 are released from the rotational operation as the lever 223 is pressed by the guide roller 222 and tilted. Further, the guide roller 216 of the shutter lever 215 substantially simultaneously reaches the forward tilted side 217d of the cam groove and the shutter lever 215 starts to swing in the closing direction.

Subsequently, the guide roller 222 of the screw feed unit abuts against the forward edge portion of the guide groove 211a and is drawn immediately before the standby position shown in FIGS. 16 and 18 is restored (F in FIG. 21) and the guide roller 216 of the shutter lever 215 reaches the bottom side 217a of the cam groove so as to close the screw-receiving port 213a of the screw chuck 213 (G in FIG. 21). The disc 220 and the ratchet wheel with pawls 219 stop at a predetermined position (H in FIG. 21).

As shown in FIG. 21, the feeding of the screw by means of the ratchet wheel with pawls 219 is substantially terminated at the point of C when the closing stroke of the shutter lever 215 is entered in the extension stroke after the termination of the operation of tightening the screw. Even in a case where the forward movement of the shank of the screw is slower than that of the screw head because the screw introduced into the screw-receiving port 213a is in a tilted posture, it is ensured that the shutter lever 215 introduces the shank of the screw into the screw chuck 213.

Needless to say, the present invention is not limited to the aforementioned embodiment thereof but may be modified in various ways within the technical scope of the invention, which is also intended to cover such variations.

According to the first aspect of the present invention, the foremost screw is held within the chuck pawls and effectively prevented from tumbling down when the nose portion is pressed against the surface of the screw-down member since the opening between the chuck pawls is closed by the guide member at the time of the screwing operation. Therefore, the screw can be guided and screwed in a right posture.

Since the operation of opening and closing the screw passage portion by means of the guide member 14 is interlocked with the movement of the nose portion relative to the screw tightener body, the screw passage portion can be opened and closed automatically without a special operation.

According to the second aspect of the present invention, the tip of the second screw can surely be conveyed in between the chuck pawls even though the screw bumps against the screw-down member and acquires the habit of bending to the coupling belt.

As set forth above, the feeding of the screw is almost completed at the point of time the shutter lever enters the closing stroke in the screw feed unit of the linked-screw tightener according to the present invention. As a result, the screw-receiving port is prevented from being closed before the screw is introduced into the screw-receiving port and the shank of the screw is set free from being sandwiched by the shutter lever and the screw guide passage even when the forward movement of the shank of the screw becomes slower than that of the screw head as the screw assumes the tilted posture, so that the certainty of screw feeding is improved.

As set forth above, the timing at which the shutter lever starts swinging in each of the contraction and extension strokes of the nose block is delayed as much as possible in the screw feed unit of the linked-screw tightener according to the present invention. Consequently, the screw is held by the screw chuck and the shutter lever until it is driven in to a certain degree and stabilized in posture during the screw-tightening operation, so that the screw is prevented from tumbling down.

The shutter lever starts to swing in the closing direction after the screw has completely fed in the extension stroke of the nose block during the screw-tightening operation. Therefore, the shutter lever is not closed before the next screw to be supplied into the screw chuck is completely inserted into the screw-receiving port, whereby a screw supply failure can be obviated.

Unlike any conventional arrangement of opening and closing a shutter lever via a cam and a lever, not only the operating load applied to the shutter lever but also the driving load to the nose block is reducible with the effect of improving the operability of linked-screw tighteners.

We claim:

1. A screw guide unit for a linked-screw tightener in which linked screws held by a coupling belt at predetermined intervals are passed through a linked-screw guide passage provided near a leading end of and across a nose portion installed movably at the leading end of a linked-screw tightener body relative to a screwing direction, a first screw is supplied into an open space between a pair of chuck pawls positioned in the substantially central part of the nose portion and capable of opening and closing in accordance with the movement of the nose portion relative to the linked-screw tightener body, and the supplied screw is driven with a driver bit, said screw guide unit comprising:

a screw receiving port formed between the pair of chuck pawls when the pawls are in a closed position, wherein said screw receiving port opens to allow a screw held by the coupling belt to be fed into an open space between the pair of the chuck pawls; and a guide member disposed proximate the pair of the chuck pawls, said guide member including means for opening and closing said receiving port in conjunction with the movement of the nose portion relative to the linked-screw tightener body to hold the fed screw between the pair of the chuck pawls.

2. The screw guide unit according to claim 1, wherein said guide member performs opening and closing operations along said screw receiving port.

3. The screw guide unit according to claim 1, further comprising:

a ratchet wheel disposed in the nose portion, for feeding the linked-screws;

a ratchet feeding mechanism connecting the linked-screw tightener body with said ratchet wheel, for rotating said ratchet wheel by a predetermined angle in a direction when the nose portion sticks out from said linked-screw tightener body;

a guide groove formed on the linked-screw tightener body parallel to a direction in which the nose portion moves;

a link having a first end and a second end, said first end being connected to said ratchet feeding mechanism;

a guide roller attached to said second end of said link, said guide roller engaging said guide groove;

a lever pivotally attached to the linked-screw tightener body, said lever being slidable within a predetermined range in a longitudinal direction within the nose holder;

means for urging said lever to contact a front side of said guide roller; and a stopper formed on the nose portion to regulate the movement of said lever.

4. The screw guide unit according to claim 1, further comprising:

a ratchet wheel disposed in the nose portion, for feeding the linked-screws;

a ratchet feeding mechanism connecting the linked-screw tightener body with said ratchet wheel, for rotating said ratchet wheel by a predetermined angle in a direction when the nose portion sticks out from said linked-screw tightener body;

a guide groove formed on the linked-screw tightener body parallel to a direction in which the nose portion moves;

a link having a first end and a second end, said first end being connected to said ratchet mechanism;

a guide roller attached to said second end of said link, said guide roller engaging said guide groove;

a lever pivotally attached to the linked-screw tightener body, said lever being slidable within a predetermined range in a longitudinal direction within the nose holder; and a spring attached to said lever, said spring urging a leading end of said lever to contact a front side of said guide roller, wherein the torque necessary to rotate said lever is greater than torque required to revolve said ratchet wheel but less than a stretching force of said spring.

5. The screw guide unit according to claim 1, further comprising:

a cam groove having a parallelogram loop formed on a side of the nose portion;

a pivotal connection linking an intermediate portion of said guide member to the side of the linked-screw tightener body; and a guide roller formed on a rear end portion of the said guide member, said guide roller engaging said cam groove to move the rear end portion of said guide member in cycles along said loop of said cam groove when the nose portion moves, wherein said loop of said cam groove is formed such that said guide member starts to swing at the last stage of each contraction and extension movement of the nose portion.

6. The screw guide unit according to claim 1, wherein said guide member further comprises means for preventing lateral movement of the fed screw while it is driven by the driver bit.

7. A screw guide unit for a linked-screw tightener in which linked screws held by a coupling belt at predetermined intervals are passed through a linked-screw guide passage provided near a leading end of and across a nose portion installed movably at the leading end of a linked-screw tightener body relative to a screwing direction, a first screw is supplied into an open space between a pair of chuck pawls positioned in the substantially central part of the nose portion and capable of opening and closing in accordance with the movement of the nose portion relative to the linked-screw tightener body, and the supplied screw is driven with a driver bit, said screw guide unit comprising:

a screw receiving port formed between the pair of chuck pawls when the pawls are in a closed position, wherein said screw receiving port opens to allow a screw held by the coupling belt to be fed into an open space between the pair of the chuck pawls; and a guide member disposed proximate the pair of the chuck pawls, for opening and closing said receiving port to hold the fed screw between the pair of the chuck pawls, wherein said guide member operates to open and close said receiving port in conjunction with the movement of the nose portion relative to the linked-screw tightener body, wherein said guide member pivots about an axis parallel to the screwing direction.

* * * * *